United States Patent Office 3,126,958
Patented Mar. 31, 1964

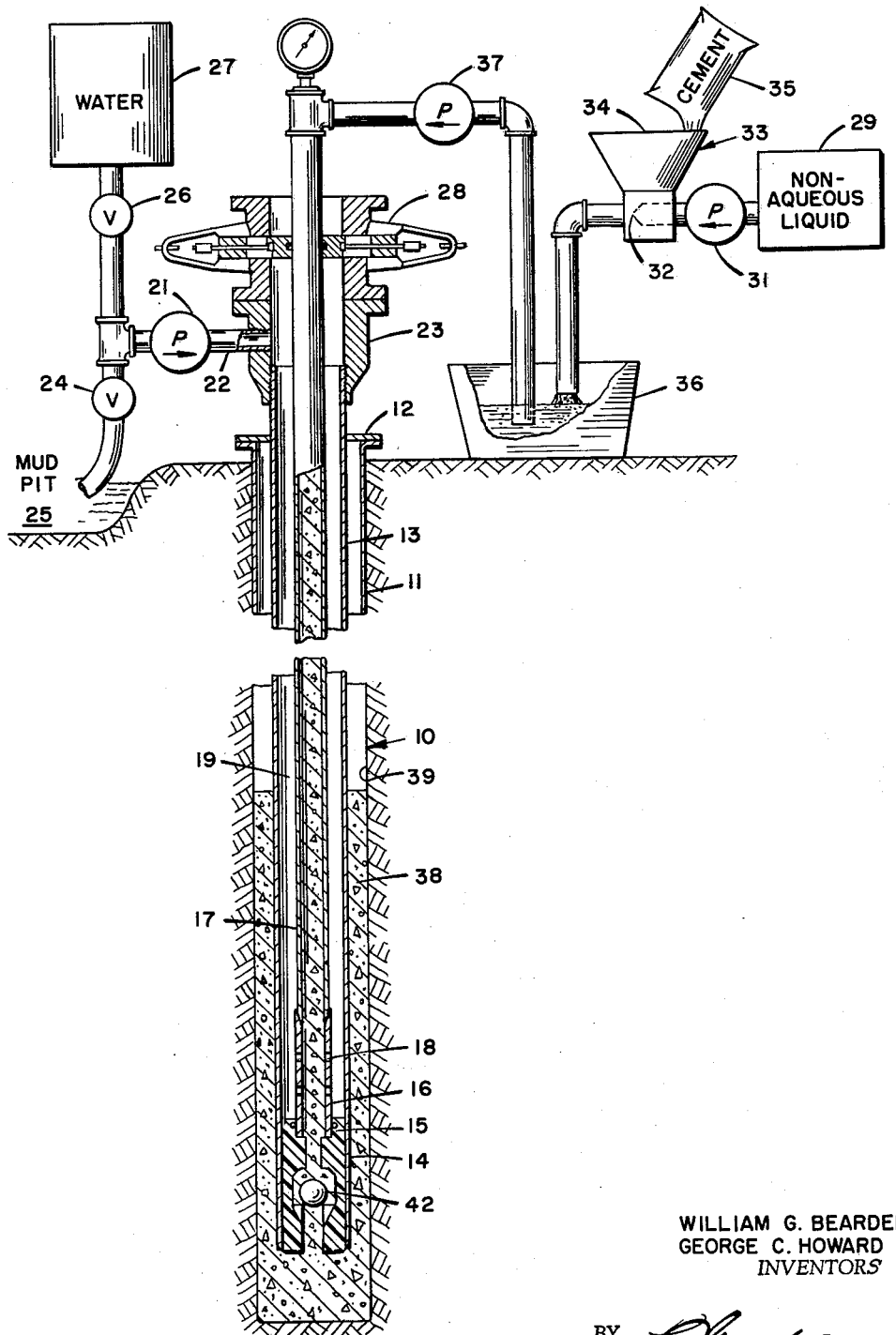

3,126,958
CEMENTING CASING
William G. Bearden and George C. Howard, Tulsa, Okla., assignors to Pan American Petroleum Corporation, Tulsa, Okla., a corporation of Delaware
Filed Mar. 2, 1959, Ser. No. 796,394
8 Claims. (Cl. 166—29)

This invention relates to the art of cementing casing. More specifically, this invention is directed to an improved process for cementing casing in a deep well.

In the art of cementing a casing in a deep well various processes and cement compositions which would permit placement of the cement before it sets have been proposed. These compositions include generally hydraulic cements, particularly Portland cement and additives thereto which delay the set of the cement under well conditions, i.e., under high pressure and temperature. A number of these additives have been shown to retard the set of Portland cement so that it can be used in most cases to cement casing in wells up to depths in the range of about 10,000 to 12,000 feet. At greater depths most additives have been found to be undependable. That is, in some cases the additives retard the set of the cement a sufficient time to permit it to be placed behind the casing if no trouble, such as a breakdown during injection of the cement into the well, is encountered. Under the most favorable conditions, however, the safety factor available with the present set retarders and cement compositions is low and in many cases, due to this low safety factor, the cement often sets too early and, therefore, sets in the casing rather than in the annular space surrounding the casing.

It is an object of this invention to provide an improved method for cementing casing. It is a more specific object of this invention to provide a method of cementing casing in a well regardless of the depth of the well. It is still a more specific object of this invention to provide a method of cementing casing in a well by either a primary or a secondary cementing technique wherein the cement-hydrating agent is mixed with the cement in the well adjacent to where the slurry leaves the casing and in the area in which the cement is to be placed. Other objects of this invention will become apparent from the following description. In this description reference will be made to the accompanying drawing which is a schematic representation of a cross section of a well and suitable surface equipment for carrying out our process.

This invention may be described in brief as a method of cementing casing wherein the cement is carried into the well through one conduit preferably as a slurry of cement in a non-hydrating or non-aqueous fluid and mixed in the well adjacent to the point where the slurry leaves the casing with a hydrating liquid which is injected into the well through a separate conduit. After the non-aqueous fluid slurry of cement is mixed with the liquid which causes it to hydrate or set, the resulting slurry is displaced only a short distance into the annular space surrounding the casing in the well. The resulting slurry can thus be placed around the casing within a short time after mixing so that even a fast-setting cement can be employed. In an embodiment of this invention finely divided clay or other hydrophilic colloid is included in the resulting cement slurry to improve the process and particularly to promote development of a final squeeze pressure.

Referring now to the drawing for a more detailed description, a well 10 has a surface pipe 11 set therein. A head 12, sometimes referred to as a bradenhead, may be used to support the oil string or casing 13 in the well or this casing may be supported in the well by other means as is well known in the art. The casing has a shoe 14 at the lower end. This shoe may be of any type but preferably it is a duplex whirler float shoe having a female seat 15 in the upper end for receiving and making a seal with the lower end of the mixing sub 16 which is attached to the lower end of drill pipe 17 or other conduit extending through the casing to the surface. The mixing sub has a number of perforations 18 in the wall thereof to provide communication between the annular space 19 and the inside of the drill pipe. These perforations are drilled radially or angularly into the periphery of the mixing sub for the purpose of jetting fluid pumped through the annulus 19 into the fluid flowing into the well through the drill pipe. Preferably these perforations are short ¼ to ½ inch pipe nipples welded into the sub with the external surface flush. The number is generally selected so that the fluid flowing in the annular space 19 is jetted at high velocity into the fluid flowing in the drill pipe to produce vigorous agitation and adequate mixing of the two fluids. An aqueous liquid pump 21 at the surface discharges water or mud into the annulus 19 through a side outlet 22 in the casing head 23. The suction of this pump is connected through a first valve 24 to a source of aqueous liquid containing clay in mud pit 25. It can also be connected either simultaneously or intermittently via a second valve 26 with another source of aqueous liquid such as a water supply 27 so that this aqueous pump can selectively inject either water or mud or both water and mud into the annulus 19 between the casing and the drill pipe. The upper end of the annulus 19 is sealed by a suitable well head or by any other means such as by closing the rams of a blowout preventer 28 as is well known in the art. A source 29 of non-aqueous liquid such as light hydrocarbons, e.g., crude or refined oils, and particularly water-miscible liquids such as the lower alcohols, is connected to the suction of mixing pump 31 which discharges this non-aqueous liquid through jet 32 in mixer 33. This mixer has a hopper 34 into which the finely divided cement 35, which is later to be mixed with the non-aqueous liquid, is poured. The slurry of non-aqueous liquid and cement produced by the jet in the mixer is discharged into the tub 36 as a non aqueous liquid-cement slurry. Non-aqueous liquid pump 37 takes suction on this tub and discharges the slurry into the top of drill pipe 17 and thence down the drill pipe and into the top of the mixing sub 16. In the mixing sub this non-aqueous liquid-cement slurry is intimately mixed with the aqueous liquid jetted into the sub through perforations 18 and the resulting non-aqueous liquid-cement-water slurry or mixture passes down through the casing shoe including any whirler jets therein and into the annular space 38 in the well between the well wall 39 and the casing 13.

When the two injection systems have been set up as described above, the aqueous liquid, typically water, is preferably first injected by aqueous liquid pump 21 through annulus 19, mixing sub 16 and the casing shoe 14 into the annulus 38 to displace mud upward from around the casing shoe and the lower end of the casing. After circulation of the aqueous liquid around the shoe has thus been established, circulation of the non-aqueous liquid, preferably without cement dispersed therein, is then established so that the aqueous and non-aqueous liquids are mixed in the mixing sub and all extraneous liquids in the casing and in the drill pipe are displaced into the annulus 38 by this mixture or emulsion. The circulation rates of these two liquids are adjusted so that the ratio of the non-aqueous liquid to the aqueous liquid is in the range of about ½ to 8, preferably about 2, parts by volume of non-aqueous liquid to one part by volume of aqueous liquid. Any amount of these two fluids may then be injected into the well through their separate conduits, mixed within the well, and the resulting mixture displaced into the well behind the casing at a rate of from 1 to about 10 barrels or more per minute. When the ratio of the two liquids is properly adjusted, cement is poured into hopper 34 and the concentration of the cement in the non-aqueous liquid is adjusted to produce a pumpable slurry. The ratio of cement to non-aqueous liquid may be varied over a substantial range. Generally between about 6 and about 15 gallons of the non-aqueous liquid are mixed with each 94-pound sack of cement. These materials may generally be combined in the proportions set out in U.S. Patent 2,842,449 to Bearden et al. A ratio of about 12 gallons of non-aqueous liquid per sack of hydraulic cement is preferred. In field operations where the liquid-cement ratio is more easily determined by measuring the gravity of the slurry than by measuring the volume of its various constituents, a slurrry weight of between about 11 and about 15 pounds per gallon, typically about 12.5 pounds per gallon, is preferred. Where a denser yet a pumpable emulsion or slurry is desired, lower ratios of non-aqueous liquid to cement may be employed by premixing with the non-aqueous liquid, prior to the addition of the non-aqueous liquid to the cement, any of a number of surface active agents soluble in the non-aqueous liquid. These surface active agents may be selected from the classes of surface active agents typically referred to as cationic and nonionic surface active agents which are soluble in the non-aqueous liquid and at low concentrations, e.g., 0.5 to 5 percent by volume, materially reduce the surface tension between the non-aqueous liquid and water. Examples of such surface active agents are nonionic polyoxyethylene sorbitol-cottonseed oil derivative, substituted propylene diamine in which one hydrogen atom has been replaced by an alkyl group containing 16 to 18 carbon atoms per molecule, tertiary amines, polyethoxy amines, polyoxyethylene thioethers and the like. As specific examples of cationic surface active agents Duomeen C, Duomeen S and Duomeen T, manufactured by Armour Chemical Company, have been added to a non-aqueous liquid such as kerosene to increase the pumpability of high cement-concentration slurries, i.e., slurries having relatively high densities. G–931, manufactured by Atlas Powder Company, is a specific example of a suitable nonionic surface active agent for this purpose. When one of these surface active agents is added to the non-aqueous liquid, we have found that the slurry is pumpable even when the concentration of the cement in the slurry is substantially increased. That is, for each 94-pound sack of cement, the non-aqueous liquid ratio may be reduced to as low as about 2½ gallons per sack of cement. These surface active agents incidentally also accelerate the wetting of the cement with the aqueous liquid and therefore tend to accelerate the set of the cement after the non-aqueous liquid slurry of cement has been mixed with the aqueous liquid within the well.

Typically between about 5 and about 500 sacks of cement are injected into the well depending upon local conditions, government regulations, etc. When all of the cement has been mixed into the non-aqueous liquid, the slurry is displaced down the drill pipe to the casing shoe with the clean non-aqueous liquid and the non-aqueous liquid-cement-aqueous liquid mixture is displaced out into the annulus 38. Injection of both aqueous and non-aqueous liquid is then stopped and the well is shut in or the fluids therein are otherwise held in equilibrium for from about 24 to about 72 hours or more to permit the cement to hydrate in place. The "waiting on cement" time depends, of course, upon the temperature of the well at the elevation of the slurry, the quantity of water in the slurry, etc. In some cases it is desirable to maintain a sample of the resulting mixture at the surface under simulated well conditions and to periodically ascertain the strength of the cement as an indication of the setting of the slurry in the well. As a general rule it is considered a safe practice to assume that the slurry has set when the sample at the surface has a tensile strength of about 10 p.s.i. or more. After the cement has set, the drill pipe is disconnected from the casing shoe by lifting or rotating the drill pipe, depending upon the nature of its seal with the casing shoe. When the drill pipe is disconnected from the casing shoe, or in some cases before it is disconnected, the surplus slurry within the drill pipe may be circulated out by either direct or reverse circulation through the perforations 18 and/or around the lower end of the drill pipe so that there is little if any danger of having cement set in the casing or drill pipe. This flushing of the drill pipe is particularly desirable when a squeeze pressure is obtained before all of the non-aqueous liquid-cement slurry is displaced from the drill pipe.

In a primary and particularly a secondary casing cementing job, i.e., a job in which cement is squeezed into the annular space 38 through perforations in the casing, it is sometimes difficult or at least requires a long time to obtain a final squeeze pressure using a non-aqueous liquid slurry of cement as described above. We have found it is often desirable therefore to inject into the annular space either ahead of the pumpable non-aqueous liquid-cement-aqueous liquid slurry, intermittently with, or following that slurry a quantity of a very viscous or plastic settable cement slurry. This viscous settable cement slurry is also produced in the well adjacent to the point at which it is displaced into the annular space surrounding the casing. This viscous slug consists of a settable mixture of finely divided bentonite or other hydrophilic clay, oil, cement, and water as disclosed in U.S. Patent 2,801,077 to Howard and Scott. The clay may be incorporated in the non-aqueous liquid-cement-aqueous liquid slurry by blending the clay with the cement in hopper 34 so that that part of the slurry which is injected into the well through the drill pipe contains non-aqueous liquid, cement, and clay. The amount of clay or other hydrophilic colloidal solid may be varied over a substantial range. We prefer, however, that in that part of the slurry which contains the hydrophilic clay solid, the proportion of clay to cement may vary from about 2 to about ¼ parts clay by weight to one part cement. About one part clay to one part cement has been found to be most satisfactory. The ratio may be changed depending upon the desired strength and viscosity of the viscous plug. The higher the clay concentration, the more viscous the slurry becomes; and the lower the clay concentration, the stronger the mixture when it finally sets.

In an alternate embodiment the hydrophilic clay is injected into the well in the aqueous liquid. In this embodiment the hydrophilic solid is first mixed with water either continuously as the water is injected into the well through annular space 19 or the two are mixed and stored in the mud pit 25 in preparation for the squeezing operation. The clay and water, i.e., the mud, can then be added to the non-aqueous liquid-cement slurry as the two are mixed within the well. In this embodiment the clay/cement ratio is also preferably about 1/1 by weight. That is, the concentration of the clay in the water is adjusted such that when the correct amount of water is injected into the well, it carries the proper amount of clay with it. The non-aqueous liquid/mud ratio is preferably about 2/1 as described above.

In a typical cementing operation, about ½–¾ of the non-aqueous liquid-cement slurry is injected into the well through the drill pipe 17 as the proper amount of water is injeced through the casing-drill pipe annulus 19 and then as the remainder of the non-aqueous liquid-cement slurry is mixed, the hydrophilic colloid is added thereto, preferably intermittently either in hopper 34 or with the aqueous liquid as described above to produce alternate slugs of about one barrel each, more or less, of a viscous mass when this clay, cement, water and non-aqueous liquid are mixed at the squeeze point in the well. This intermittent injection of clay may be obtained in the above-described alternate embodiment in which the clay is injected into the well with the water by periodically closing and opening valve 26 as valve 24 is simultaneously opened and closed so that slugs of clay containing water are injected down the drill pipe-casing annulus 19 and blended at the mixing sub into the non-aqueous liquid-cement slurry flowing down the drill pipe. These clay-containing slugs produce viscous plugs almost instantly and are pumpable for only a very short time. While the bentonite-cement-water-non-aqueous liquid slug or slugs remain pumpable, they are displaced into the annular space 38. When they become immobile, the pump or displacement pressure rises and the liquids in the slurries, particularly in the intermediate cement-water-non-aqueous liquid slug or slugs is squeezed into the surrounding earth formations through the permeable well walls. The cement particles are thus partially dehydrated and compacted so that when the cement eventually hydrates or sets, it produces an impermeable seal in the annular space surrounding the casing. Where the ratio of bentonite to cement is relatively low and the resulting slug of bentonite, cement, water and non-aqueous liquid produces a less viscous plug, it is sometimes desirable to perform what is often referred to as a "hesitation" squeeze in which both pumps 21 and 37 are periodically stopped to allow some reaction between the cement and the clay and some dehydration of the cement slurry as the last of the slurry is injected into the well. This procedure often assists in obtaining a final squeeze pressure where it cannot otherwise be obtained.

When a squeeze pressure is obtained, there is normally surplus cement left in the drill pipe. The drill pipe may then be disconnected from the casing shoe as above described and since the ball 42 prevents the slurry in the annulus from flowing back into the casing, the remaining cement in the drill pipe may be circulated out either by direct or reverse circulation so that that part of the non-aqueous liquid-cement slurry which is mixed with the water or mud within the casing will not set and stick the drill pipe in the well.

From the foregoing it is manifest that this invention is susceptible of a wide variety of embodiments and that the invention is not limited to the scope of the description which has been given by way of illustration. The invention should therefore be construed to be limited only by the scope of the appended claims.

We claim:

1. A method of cementing casing in a well comprising the steps of injecting into said well through a first conduit a non-aqueous liquid slurry of finely divided hydraulic cement, simultaneously injecting into said well through a second conduit an aqueous liquid capable of hydrating said cement, the ratio of said cement to said aqueous liquid being sufficient to produce a settable cement composition, intimately mixing within said well at a point adjacent to the outlet of said casing said slurry and said aqueous liquid to produce a settable, readily-flowable, uniform mixture thereof, and as said slurry and said aqueous liquid are mixed, displacing the mixture thereof into the annular space behind said casing in said well to cement said casing in said well.

2. A method according to claim 1 including injecting into said well in a part of one of said slurry and said aqueous liquid a sufficient quantity of a hydrophilic colloid to produce a plastic plug when said slurry and said aqueous liquid are mixed.

3. A method of cementing casing in a well comprising injecting into said well and displacing to near the casing outlet through separate conduits a first quantity of water and a first quantity of a non-aqueous liquid slurry of finely divided hydraulic cement, intimately mixing within said well near said casing outlet said first quantity of water and said first quantity of non-aqueous liquid slurry of finely divided hydraulic cement to produce a settable cement slurry, subsequently injecting into said well a second quantity of water, a finely divided hydrophilic clay and a second quantity of said non-aqueous liquid slurry of finely divided hydraulic cement, said second quantity of water and said second quantity of non-aqueous liquid slurry of finely divided hydraulic cement being injected into said well and displaced to near the outlet of said casing through separate conduits, intimately mixing within said well near said casing outlet said second quantity of water said hydrophilic clay and said second quantity of non-aqueous liquid slurry of finely divided hydraulic cement to produce a settable plastic slug, displacing said settable cement slurry and at least part of said settable plastic slug into the annulus behind said casing in said well.

4. A method according to claim 3 in which a hydrophilic clay is injected into said well in said second quantity of water.

5. A method according to claim 3 in which a hydrophilic solid is injected into said well in said second quantity of non-aqueous liquid slurry of finely divided hydraulic cement.

6. A method of cementing casing in a well comprising injecting into said well and displacing to near the lower end of said casing through separate conduits water and a non-aqueous liquid slurry of finely divided hydraulic cement, intimately mixing said water and said non-aqueous liquid near the lower end of said casing to produce a settable cement composition and displacing a first quantity of said settable cement composition into the annulus surrounding said casing as said settable cement composition is produced, intermittently mixing with said settable cement composition a finely divided hydrophilic clay to produce a settable plastic composition, and displacing at least a part of said settable plastic composition into said annulus.

7. A method according to claim 6 in which said finely divided hydrophilic clay is dispersed in said water.

8. A method according to claim 6 in which said finely divided hydrophilic clay is dispersed in said non-aqueous liquid slurry of finely divided hydraulic cement.

References Cited in the file of this patent

UNITED STATES PATENTS

| | | |
|---|---|---|
| 1,057,789 | Wigle | Apr. 1, 1913 |
| 1,807,050 | Stolz | May 26, 1931 |
| 2,075,882 | Brantly | Apr. 6, 1937 |
| 2,595,184 | Wrightsman | Apr. 29, 1952 |
| 2,801,077 | Howard et al. | July 30, 1957 |
| 2,848,051 | Williams | Aug. 19, 1958 |